United States Patent [19]

Lukas et al.

[11] 4,182,546

[45] Jan. 8, 1980

[54] MULTIPLE CONNECTOR FOR OPTICAL FIBRES

[75] Inventors: Helmut H. Lukas, Carleton Place; Jack F. Dalgleish, Ottawa, both of Canada

[73] Assignee: Northern Telecom Limited, Montreal, Canada

[21] Appl. No.: 880,006

[22] Filed: Feb. 21, 1978

[51] Int. Cl.² .............................................. G02B 5/14
[52] U.S. Cl. ................................................. 350/96.21
[58] Field of Search ................ 350/96.20, 96.21, 96.22

[56] References Cited

U.S. PATENT DOCUMENTS 4,076,379   2/1978   Chouinard ..................... 350/96.22

FOREIGN PATENT DOCUMENTS 2291510   6/1976   France ........................ 350/96.21
2628747   1/1977   Fed. Rep. of Germany ........ 350/96.21

*Primary Examiner*—Rolf G. Hille
*Attorney, Agent, or Firm*—Sidney T. Jelly

[57] ABSTRACT

A multiple connector for releasably connecting a plurality of pairs of optical fibres having two connector members, one having an axially moveable member therein with a plurality of axial holes, the other member having a plurality of aligning members extending axially. When assembled, an aligning member is aligned with an axial hole. The aligning member has a central bore portion a close fit on an uncoated fibre and tapered bores leading into the central bore portion. The axially moveable member is resiliently biased to project from a front face of the related connector member. On assembly the axially moveable member is pushed back into the connector member to expose one set of fibre ends which enter the aligning members. The other set of fibre ends are initially positioned in the aligning members. Preferably holding members are attached to the fibres and inserted from the rear of each connector member. This permits rear insertion of fibres. The holding members having locating members thereon for positioning the holding members, and the fibres axially in the connector members. Housings enclose the rear ends of the connector members.

6 Claims, 5 Drawing Figures

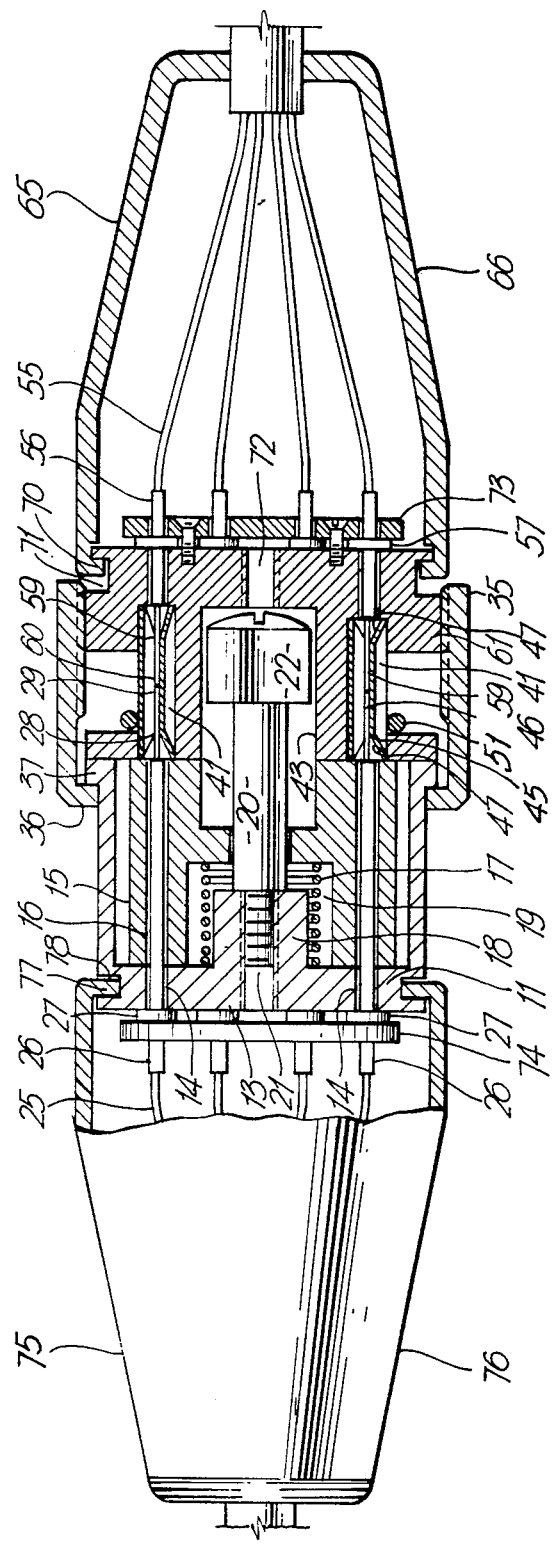

MULTIPLE CONNECTOR FOR OPTICAL FIBRES

This invention relates to connectors for releasably connecting a plurality of pairs of optical fibres, and in particular a connector which permits individual insertion and replacement and good protection for the fibre ends when in the uncoupled condition.

It is a requirement that optical fibre connectors should provide low-loss fibre-to-fibre connection, even after several makes and breaks of the connector. Also it is desirable that the fibre ends be protected from damage when the connector is open or uncoupled. The present invention provides a multiple connector, which enables low-loss connections to be made; permits fibres to be individually inserted and removed; enables fibres to be inserted from the rear of each connector part, that is remote from the "joint" face; and can permit access to the fibre ends for cleaning.

Basically a connector, in accordance with the present invention, comprises two connector members, one of the members housing a plurality of aligning members, an aligning member for each pair of fibres to be connected, and the other member housing an axially moveable member having a plurality of axially extending holes therethrough, a hole for an alignment with each aligning member when the two connector members are assembled. The axially moveable member is resiliently urged outwards, in an axial direction, the holes encompassing the bare fibre ends. As the connector parts are assembled, the axially moveable member is pushed back and the fibre ends enter the aligning members.

The invention will be readily understood by the following description of an embodiment, by way of example, in conjunction with the accompanying drawings, in which:

FIG. 1 is a cross-section on the axis of one of the connector members;

FIG. 2 is a cross-section on the axis of the other of the connector members;

FIG. 3 is a front view on the joint face of the connector member of FIG. 1, in the direction of arrow A;

FIG. 4 is a front view on the joint face of the connector member of FIG. 2, in the direction of arrow B;

FIG. 5 is a cross-section through an assembled or coupled connector.

As illustrated in FIGS. 1 and 3, a first connector member 10 comprises a cup-shaped housing 11 open at a front face 12 and closed by a rear wall 13. In the rear wall 13 is a plurality of bores 14, in the present example six, equally spaced on a common radius. Axially slidable within the housing 11 is a protecting member 15. The member 15 has a plurality of bores 16, a bore 16 aligned with each bore 14. A compression spring 17 extends between the inner side of the rear wall 13 and the protecting member 15. The spring 17 is positioned over a boss 18 on the rear wall 13 and into a recess 19 in the protecting member 15. A screw 20 extending through the protecting member 15 is threaded into a threaded hole 21 in the boss 18, the head 22 engaging with the protecting member 15 and preventing complete withdrawal of the member from within the housing. The head 22 also acts as a locating member for the other connector member. The recess 19 is dimensioned to accept the boss 18 and the spring 17 when the protecting member 15 is pushed back into the housing.

Coated optical fibres 25 are inserted into holding members 26, which pass through the bores 14. The holding members each have a flange or other locating feature 27 intermediate the ends of each member, the flange acting as a positioning member against the rear surface of the rear wall 13. A coated fibre 25 is inserted into each member 26, with an uncoated portion 28 extending beyond the member. The member 26 is fastened to the fibre, as by crimping or bonding, and the flange 27 also acts as a datum member for the length of uncoated fibre extending beyond the holding member and for the end 29 of the fibre. The various parts and lengths are dimensioned such that the ends 29 of the fibres are just within the bores 16 of the protecting member 15 when it is in the forward or extended position.

A nut 35 is axially slidable on the outer surface of the housing 11, the nut having an inwardly directed flange 36 at its rear end which engages with an outwardly directed flange 37 at the front end of the housing. A locating hole 38 is provided in the front face of the protecting member 15.

FIGS. 2 and 4 illustrate a second connector member 40. Connector member 40 has a plurality of axially extending bores 41 therethrough, the bores 41 positioned to align with bores 16 in the protecting member 15. In the centre of the connector member 40, and extending from a front face 42, is an axial bore 43 of a diameter to accept the head 22 of the screw 20 in the first connector member 10. In the bores 41 are positioned aligning members 45, an aligning member in each bore. The actual form of the aligning members may vary but typically each comprise a central bore 46 of a size to be a close sliding fit on an uncoated fibre with convergent guiding surfaces 47 at each end of the bore 46. The aligning members 45 are a sliding fit in the bores 41. One typical form of an aligning member is formed from metal tubing formed inwards at the centre to form lobes which define the bore 46, as described and illustrated in U.S. Pat. No. 3,972,585 issued Aug. 3, 1976.

It is convenient to be able to easily remove the aligning members 45, for cleaning or replacement. This can be achieved by cutting a groove around the connecting member 40, with the bottom of the groove breaking through into the bores 41. The groove is indicated at 50. A resilient ring 51 can be positioned in the groove 50 to frictionally hold the aligning members 45 in the bores 41 in the uncoupled condition.

Coated fibres 55 are inserted into holding members 56 which in turn are inserted into the bores 41. The bores 41 are reduced in diameter at the rear ends to be a close sliding fit on the holding members 56. A flange or other locating feature 57 is provided on each holding member 56 for positioning against the rear face 58 of the connector member 40. An uncoated portion 59 of fibre extends out of each holding member 56, extending into the aligning members 45, with the ends 60 of the fibres positioned in the bores 46 of the aligning members.

The rear part 61 of the second connector member 40 is threaded to receive the nut 35 on the first connector member 10. A locating pin 62 is provided in the front face 42 of the connector member 40, the pin 62 positioned to locate in the hole 38 in the protecting member 15, to give rotational alignment.

Connection is made by moving the two connector members together axially, in axial alignment, with pin 62 in hole 38. As the two connector members are pushed together, the second connector member 40 pushes the protecting member 15 rearwards into the housing 11. The screw head 22 slides into the recess 43 to align the two connector members. As the protecting member 15 moves rearwardly it exposes the end portions, the uncoated portions 28, of the fibres 25 and these move into the alignment members 45. The fibres are guided by the convergent surfaces 47 so that the ends 29 abut the ends 60 of fibres 55, in the bores 46 of the alignment members. At this time the front faces 12 and 16 of the housing 11 and protecting member 15 are in contact with the front face 42 of the member 40. The connector is held assembled by the nut 35 engaging with the threaded portion 61, with the flanges 36 and 37 also in engagement. A small gap may exist between the opposed ends 29 and 60 of the fibres 25 and 55, and an index matching fluid can be inserted into the alignment members before assembly of the connector. The assembled connector is illustrated in cross-section in FIG. 5.

The holding members 26 and 56 are a close sliding fit in the respective bores 14 and rear parts of bores 41. Once the fibres have been inserted into the holding members and fixed therein, as by crimping or bonding, the holding members are pushed into the related connector members. Split sleeves or housings are then attached to each connector member. In FIG. 5 a split sleeve composed of two hollow halves 65 and 66 are attached to the connector member 40.

The two split sleeves form a tubular member having an inwardly extending flange 70 which engages in a circumferential groove 71 in the connector member 40.

The holding members 56 are held in place against the rear face of the rear part 61 of the second connector member 40. One way would be to provide a disc like member with peripheral recesses, the member fitting over the flanges 57 with the recess fitting round the holding members 56. Such a disc like member could be received by a central screw engaging with a thread in the bore 72 if not used for anchoring a strain relief member. A more convenient way is to position small plates 73 between adjacent pairs of holding members, the ends of the plates overlapping the flanges 57. The plates are retained by screws screwing into the part 61. This means that only one holding member need be loosened at one time by removal of the plates on either side of the holding member.

Similarly, the holding members 26 are held in place by small plates 74 retained by small screws screwing into the rear wall 13 of connector member 10.

Screws connect the two halves of the split sleeve together. A similar arrangement is provided for connector member 10, there being two halves 75 and 76. An inwardly directed flange 77 engages in a groove 78 in the rear end of the housing 11. Again the two halves are held together by screws.

The particular form of the connector has several advantages. For example, there is rear insertion for each fibre which enables pre-assembly of parts; that is the cable pulled through; fibres prepared; the holding members attached, then the holding members with fibres pushed through the connector members. The connector parts are then coupled via the nut.

The guide members are removable for cleaning, and each individual fibre can be removed with its holding member, without interfering with the other fibres.

For a bulk-head connector, one part of the connector can be mounted on the bulk-head.

While not shown, a strain relief member may be incorporated in the cable, for example a flexible metal wire extending through the centre of the cable. This member can be attached to anchoring means screwed into the end of the bore 21 in the housing 11 and into the bore 73 in the rear of the member 40.

As stated, the guide members can be of various forms, such as preformed tubes as already described or glass tubes formed to have a "waisted" centre section to provide the small bore into which the ends of the fibres fit.

What is claimed is:

1. A multiple connector for releasably connecting a plurality of pairs of optical fibres, comprising:
    a first connector member and an axially moveable member in the first connector, the moveable member including a plurality of axial bores therethrough;
    a second connector member having a plurality of axial bores extending therethrough, each bore in the second connector member aligned with an axial bore in the moveable member to form a plurality of aligned pairs of bores;
    a front face on each of said first and second connector members and means releasably connecting and retaining the connector members in an assembled condition with said front faces in contact;
    means for resiliently urging said axially moveable member to project from said front face of said first connector member when said connector members are disassembled, said axially moveable member including a front face in contact with the front face of the second connector member in the assembled condition;
    a plurality of aligning members in said second connector member, an aligning member in a forward part of each of said axial bores, each alignment member including a central bore of a diameter to be a close fit on an uncoated end of a fiber;
    a holding member in each of said axial bores in said moveable member and a holding member in a rear part of each of said axial bores in said second connector member, each holding member including a locating flange intermediate its length;
    said locating flanges in engagement with rear faces on each of said connector members;
    removeable fastening means attached to said rear faces and engaging with said locating flanges to retain said holding members in said connector members with said locating flanges in contact with said rear faces, and to permit removal and replacement of any holding member;
    an optical fiber in each holding member, each said holding member attached to a coated portion of a fiber and an uncoated length of fiber extending from a forward end of each holding member for a predetermined distance relative to said locating flange, the ends of pairs of fibers in holding members positioned in said pairs of bores being in opposed substantially abutting relationship in said aligning members when said connector members are assembled.

2. A connector as claimed in claim 1 including an alignment member on the axis of said first connector member; a bore in said second connector coaxial with the axis thereof, said bore adapted to receive said alignment member on assembly of said connector members.

3. A connector as claimed in claim 1 each of said aligning members comprising a tubular member having a central bore intermediate the ends of the aligning member and of a diameter to be a close fit on an uncoated end of an optical fibre, and a tapered bore at each end of said central bore, said tapered bores having surfaces inclined outwards in a direction towards the ends of the aligning member.

4. A connector as claimed in claim 2 said alignment member extending through said axially moveable member and connected at an inner end to a rear wall of said first connector member, and including an enlarged portion at an outer end, said enlarged portion a close sliding fit in said bore in said second connector member and acting to limit outward movement of said axially moveable member.

5. A connector as claimed in claim 1 including a peripherally extending groove in an outer surface of said second connector member, said groove extending radially inwards to expose said axial bores, and a resilient ring member in said grooves, said ring member frictionally engaging said aligning members to retain said aligning members in said axial bores.

6. A connector as claimed in claim 1 including a housing attached to the rear part of each connector member, each housing enclosing the rear part of each connector member and including an entry aperture for said optical fibres.

* * * * *